United States Patent
He et al.

(10) Patent No.: US 9,494,447 B2
(45) Date of Patent: Nov. 15, 2016

(54) METHODS AND SYSTEMS FOR ATTITUDE DIFFERENTIATION IN ENHANCED VISION IMAGES

(75) Inventors: Gang He, Morristown, NJ (US); Thea L. Feyereisen, Hudson, WI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 12/845,624

(22) Filed: Jul. 28, 2010

(65) Prior Publication Data

US 2012/0026190 A1 Feb. 2, 2012

(51) Int. Cl.
| G09G 5/02 | (2006.01) |
| G01C 23/00 | (2006.01) |
| G06T 11/00 | (2006.01) |
| G01C 21/00 | (2006.01) |

(52) U.S. Cl.
CPC ............... *G01C 23/00* (2013.01); *G01C 21/00* (2013.01); *G06T 11/001* (2013.01); *G09G 5/02* (2013.01)

(58) Field of Classification Search
USPC .................................... 701/3; 340/971, 967
See application file for complete search history.

(56) References Cited

U.S. PATENT DOCUMENTS

| 5,181,028 | A | 1/1993 | Sharpe et al. |
| 6,150,960 | A | 11/2000 | Voulgaris |
| 6,173,220 | B1 | 1/2001 | Schmitt |
| 6,292,721 | B1 | 9/2001 | Conner et al. |
| 6,567,014 | B1 | 5/2003 | Hansen et al. |
| 6,686,850 | B2 | 2/2004 | Hausmann |
| 6,702,229 | B2 | 3/2004 | Anderson et al. |
| 7,295,135 | B2 | 11/2007 | Younkin |
| 7,418,318 | B2 * | 8/2008 | Hrabak et al. ..................... 701/3 |
| 7,724,155 | B1 | 5/2010 | Anderson et al. |
| 2003/0179109 | A1 | 9/2003 | Chamas et al. |
| 2005/0278753 | A1 * | 12/2005 | Brady et al. .................... 725/76 |
| 2007/0085705 | A1 * | 4/2007 | He et al. ........................ 340/967 |
| 2007/0171094 | A1 | 7/2007 | Alter et al. |
| 2008/0215204 | A1 | 9/2008 | Roy et al. |
| 2008/0252489 | A1 * | 10/2008 | Naimer et al. ................. 340/971 |
| 2008/0262664 | A1 | 10/2008 | Schnell et al. |
| 2010/0141482 | A1 | 6/2010 | Wyatt et al. |

FOREIGN PATENT DOCUMENTS

| EP | 2196774 A2 | 6/2010 |
| WO | 2008018906 A2 | 2/2008 |
| WO | 2008153597 A1 | 12/2008 |

OTHER PUBLICATIONS

EP Search Report, EP 11173167.5-1236 dated Nov. 21, 2011.

(Continued)

*Primary Examiner* — Phi Hoang
(74) *Attorney, Agent, or Firm* — Lorenz & Kopf, LLP (57) ABSTRACT

Methods and systems are provided for displaying information on a flight deck display onboard an aircraft. An exemplary method comprises obtaining image data for an imaging region and displaying, on the display device, a graphical representation of a first portion of the image data using a first visually distinguishable characteristic and a graphical representation of a second portion of the image data using a second visually distinguishable characteristic. The first portion corresponds to a portion of the image data above an attitude reference and the second portion corresponds to a portion of the image data below the attitude reference, and the first visually distinguishable characteristic and the second visually distinguishable characteristic are different.

20 Claims, 3 Drawing Sheets

(56) References Cited

OTHER PUBLICATIONS

Feyereisen, T.L., et al.; Display Systems and Methods for Displaying Enhanced Vision and Synthetic Images; filed with the U.S. Patent Office on Mar. 16, 2010 and assigned U.S. Appl. No. 12/725,320.

CN Office Action for Application No. CN 201110211668.7 dated Jan. 5, 2016.
CN Office Action for Application No. CN 201110211668.7 dated Nov. 3, 2014.
CN Office Action for Application No. CN 201110211668.7 dated Jul. 2, 2015.

* cited by examiner

METHODS AND SYSTEMS FOR ATTITUDE DIFFERENTIATION IN ENHANCED VISION IMAGES

TECHNICAL FIELD

The subject matter described herein relates generally to avionics systems, and more particularly, embodiments of the subject matter relate to attitude differentiation when displaying images captured by an imaging device onboard an aircraft.

BACKGROUND

Modern flight deck displays (or cockpit displays) for vehicles (such as an aircraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display. The perspective view provides a three-dimensional view of the vehicle flight plan (or vehicle forward path) and may include various map features including, for example, weather information, terrain information, political boundaries, and navigation aids (e.g., waypoint symbols, line segments that interconnect the waypoint symbols, and range rings). The terrain information may include situational awareness (SA) terrain, as well as terrain cautions and warnings which, among other things, may indicate terrain that may obstruct the current flight path of the aircraft. In this regard, some modern flight deck display systems incorporate a synthetic terrain display, which generally represents a virtual or computer simulated view of terrain rendered in a conformal manner. The primary perspective view used in existing synthetic vision systems emulates a forward-looking cockpit viewpoint. Such a view is intuitive and provides helpful visual information to the pilot and crew.

The integrity of the synthetic terrain display is limited by the integrity of the information pre-stored in the database utilized to render the terrain. Accordingly, synthetic vision systems often utilize onboard imaging devices to augment or enhance the forward-looking cockpit view. For example, an enhanced vision system may use an infrared and/or millimeter wave video camera to sense objects and/or terrain features and render real-time imagery based on the sensed objects and/or terrain features that is overlaid onto the synthetic terrain display. In this manner, the enhanced vision system may provide higher integrity terrain imagery as well as imagery corresponding to various non-terrain features, such as other vehicles and buildings, which are not represented by a priori databases. These enhanced synthetic vision systems are particularly useful when operating a vehicle or aircraft in instrument meteorological conditions (IMC) or conditions of reduced visibility, such as, for example, whiteout, brownout, sea-spray, fog, smoke, low light or nighttime conditions, other inclement weather conditions, and the like. It is desirable that these enhanced vision systems be perceived quickly and intuitively without detracting from the situational awareness of the pilot and/or crew.

BRIEF SUMMARY

A method is provided for displaying information on a display device associated with a vehicle. The method comprises obtaining image data for an imaging region proximate the vehicle and displaying, on the display device, a graphical representation of a first portion of the image data using a first visually distinguishable characteristic and a graphical representation of a second portion of the image data using a second visually distinguishable characteristic. The first portion corresponds to a portion of the image data above an attitude reference and the second portion corresponds to a portion of the image data below the attitude reference, and the first visually distinguishable characteristic and the second visually distinguishable characteristic are different.

In another embodiment, a display system is provided. The display system comprises a display device having a primary flight display rendered thereon, an imaging device configured to obtain image data for a region, and a processing system coupled to the display device and the imaging device. The processing system is configured to display a graphical representation of the image data on the primary flight display, wherein a first portion of the graphical representation is visually distinguishable from a second portion of the graphical representation. The first portion corresponds to image data above an attitude reference and the second portion corresponds to image data below the attitude reference.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Technologies and concepts discussed herein relate to systems for visually partitioning real-time images received from an imaging device onboard a vehicle, such as an aircraft, to enhance the ability of a user (e.g., a pilot or crew member) to quickly and accurately determine the relative altitude and/or attitude of the features shown in the real-time images. The real-time images are partitioned using distinguishable characteristics, such as, for example, visually distinguishable colors or levels of transparency, to allow a pilot or crew member to intuitively identify the relative altitude and/or attitude of the respective portions of an image. Additionally, the visually distinguishable characteristics may be dynamically chosen (e.g., based on the phase of flight of the aircraft, the image quality, user-specified preferences, and the like) to provide a seamless transition between the surrounding display (e.g., the neighboring terrain when the images are overlaid over a synthetic perspective view of terrain) and avoid distracting the pilot. Although the subject matter may be described herein in an aviation context, subject matter may be utilized with vehicles, such as, ground-based vehicles, spacecraft or other agile vehicles, or maritime vessels.

Figure 1:
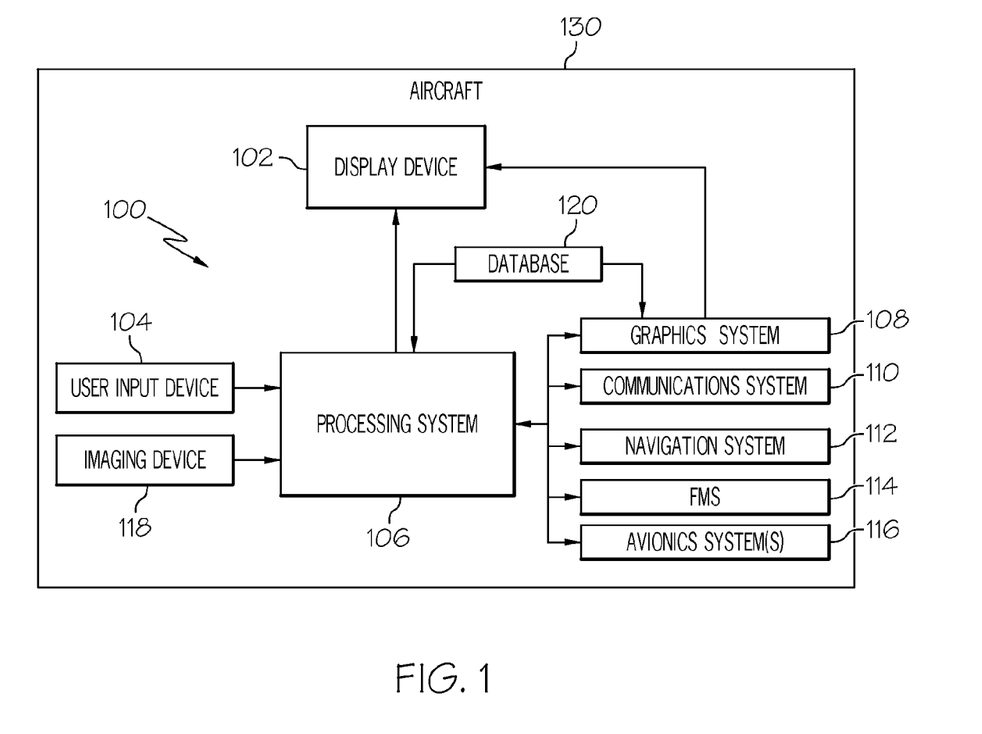
FIG. 1 is a block diagram of a display system suitable for use in an aircraft in an exemplary embodiment.

FIG. 1 depicts an exemplary embodiment of a display system 100 which may be utilized with a vehicle, such as an aircraft 130. In an exemplary embodiment, the display system 100 includes, without limitation, a display device 102, a user input device 104, a processing system 106, a graphics system 108, a communications system 110, a navigation system 112, a flight management system (FMS) 114, one or more avionics systems 116, an imaging device 118, and a database 120. In an exemplary embodiment, the elements of the display system 100 are suitably configured to display, render, or otherwise convey an enhanced synthetic perspective view in a primary flight display on the display device 102, as described in greater detail below.

It should be understood that FIG. 1 is a simplified representation of the display system 100 for purposes of explanation and ease of description, and FIG. 1 is not intended to limit the application or scope of the subject matter described herein in any way. It should be appreciated that although FIG. 1 shows the elements of the display system 100 as being located onboard the aircraft 130, in practice, one or more of the elements of display system 100 may be located outside the aircraft 130 (e.g., on the ground as part of an air traffic control center or another command center) and communicatively coupled to the remaining elements of the display system 100 (e.g., via a data link and/or communications system 110). For example, in some embodiments, the display device 102, user input device 104, imaging device 118 and/or database 120 may be located outside the aircraft 130 and communicatively coupled to the other elements of the display system 100. Furthermore, practical embodiments of the display system 100 and/or aircraft 130 will include numerous other devices and components for providing additional functions and features, as will be appreciated in the art. In this regard, it will be appreciated that although FIG. 1 shows a single display device 102, in practice, additional display devices may be present onboard the aircraft 130.

The display device 102 is realized as an electronic display configured to graphically display flight information or other data associated with operation of the aircraft 130 under control of the graphics system 108 and/or processing system 106. In this regard, the display device 102 is coupled to the graphics system 108 and the processing system 106, and the processing system 106 and the graphics system 108 are cooperatively configured to display, render, or otherwise convey one or more graphical representations or images associated with operation of the aircraft 130 on the display device 102, as described in greater detail below. The user input device 104 is coupled to the processing system 106, and the user input device 104 and the processing system 106 are cooperatively configured to allow a user (e.g., a pilot, co-pilot, or crew member) to interact with the display device 102 and/or other elements of the display system 100 in a conventional manner. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the display system 100 in a "hands free" manner without requiring the user to move his or her hands and/or head to interact with the display system 100. In accordance with one or more embodiments, the user input device 104 is adapted to receive input indicative of different visually distinguishable characteristics and provide the input to the processing system 108 for displaying portions of image data obtained from imaging device 118 in accordance with the different visually distinguishable characteristics, as described in greater detail below.

The processing system 106 generally represents the hardware, software, and/or firmware components configured to facilitate communications and/or interaction between the display device 102 and the other elements of the display system 100 and perform additional tasks and/or functions to support displaying an enhanced synthetic perspective view of a primary flight display on the display device 102, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the display system 100, as described in greater detail below. Furthermore, the steps of a method or algorithm described in connection with the embodiments disclosed herein may be embodied directly in hardware, in firmware, in a software module executed by the processing system 106, or in any practical combination thereof. Although FIG. 1 depicts processing system 106 as a distinct and separate element of the display system 100, in practice, the processing system 106 may be integrated with another element of the display system 100, such as the graphics system 108, the FMS 114, or the navigation system 112.

The graphics system 108 is coupled to the processing system 106, and the graphics system 108 generally represents the hardware, software, and/or firmware components configured to control the display and/or rendering of one or more navigational maps and/or other displays pertaining to operation of the aircraft 130 and/or systems 110, 112, 114, 116 on the display device 102. In this regard, the graphics system 108 may access or include one or more databases 120 suitably configured to support operations of the graphics system 108, such as, for example, a terrain database, an obstacle database, a navigational database, a geopolitical database, a terminal airspace database, a special use airspace database, or other information for rendering and/or displaying content on the display device 102. In an exemplary embodiment, the graphics system 108 accesses a synthetic vision terrain database 120 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 130, as described in greater detail below.

In an exemplary embodiment, the processing system 106 is coupled to the navigation system 112, which is configured to provide real-time navigational data and/or information regarding operation of the aircraft 130. The navigation system 112 may be realized as a global positioning system (GPS), inertial reference system (IRS), or a radio-based navigation system (e.g., VHF omni-directional radio range (VOR) or long range aid to navigation (LORAN)), and may include a radar altimeter, one or more navigational radios or other sensors suitably configured to support operation of the navigation system 112, as will be appreciated in the art. The navigation system 112 is capable of obtaining and/or determining the instantaneous position of the aircraft 130, that is, the current location of the aircraft 130 (e.g., the current latitude and longitude) and the current altitude or above ground level for the aircraft 130. Additionally, in an exemplary embodiment, the navigation system 112 includes inertial reference sensors capable of obtaining or otherwise determining the attitude or orientation (e.g., the pitch, roll, and yaw, heading) of the aircraft 130 relative to earth.

In the illustrated embodiment, the processing system 106 is also coupled to the communications system 110, which is configured to support communications to and/or from the aircraft 130. The communications system 110 is suitably configured to support communications between the aircraft 130 and air traffic control or another suitable command center or ground location. In this regard, the communications system 110 may be realized using a radio communication system or another suitable data link system.

In an exemplary embodiment, the processing system 106 is also coupled to the FMS 114. The FMS 114 maintains information pertaining to a flight plan for the aircraft 130. The FMS 114 is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 130 to the processing system 106. Although FIG. 1 depicts a single avionics system 116, in practice, the display system 100 and/or aircraft 130 will likely include numerous avionics systems for obtaining and/or providing real-time flight-related information that may be displayed on the display device 102 or otherwise provided to a user (e.g., a pilot, a co-pilot, or crew member). For example, practical embodiment of the display system 100 and/or aircraft 130 will likely include one or more of the following avionics systems suitably configured to support operation of the aircraft 130: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In an exemplary embodiment, the FMS 114 (or another avionics system 116) is configured to determine, track, or otherwise identify the current flight phase of the aircraft 130. As used herein, a flight phase of the aircraft 130 should be understood as a distinguishable segment of the operation (or distinguishable operating phase) of the aircraft 130 associated with traversing the aircraft 130 from a starting location to an ending location. For example, operation of the aircraft 130 from a starting location (e.g., a terminal at a first airport) to an ending location (e.g., a terminal at a second airport) usually comprises a plurality of flight phases, such as, for example, a standing phase (e.g., when the aircraft is stationary on the ground), a pushback or towing phase (e.g., when the aircraft is moving on the ground with assistance), a taxiing phase, a takeoff phase, a climbing phase (e.g., including the initial climb and/or climb to cruise), a cruising phase, a descent phase (e.g., from cruise altitude to initial approach), an approach phase, a landing phase, a rollout phase, and the like. Various phases of flight are well known, and will not be described in detail herein. It should be noted that the phases of flight may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases.

In an exemplary embodiment, the imaging device 118 is coupled to the processing system 106 and generally represents the components of the display system 100 configured to capture, sense, or otherwise obtain real-time imagery corresponding to an imaging region proximate the aircraft 130. In this regard, the imaging device 118 captures an image or frame corresponding to the imaging region at regular intervals (e.g., the refresh rate of the imaging device 118) for subsequent display on the display device 102, as described in greater detail below. In an exemplary embodiment, the imaging device 118 is realized as an infrared (IR) video camera or a millimeter wave (MMW) video camera that is mounted in or near the nose of the aircraft 130 and calibrated to align the imaging region with a particular location within a viewing region of a primary flight display rendered on the display device 102. For example, the imaging device 118 may be configured so that the geometric center of the imaging region is aligned with or otherwise corresponds to the geometric center of the viewing region. In this regard, the imaging device 118 may be oriented or otherwise directed substantially parallel an anticipated line-of-sight for a pilot and/or crew member in the cockpit of the aircraft 130 to effectively capture a forward looking cockpit view of the imaging region.

Although FIG. 1 depicts the imaging device 118 as being located onboard the aircraft 130, in some embodiments, the imaging device 118 may be located outside the aircraft 130 and communicatively coupled to the processing system 108 via communications system 110. In this regard, in some embodiments, the processing system 108 may download image data corresponding to a previously flown approach, flight path, or trajectory, and correlate and/or synchronize the downloaded image data with the three-dimensional conformal synthetic perspective view of the terrain proximate the aircraft 130 rendered on the display device 102. In other embodiments, the imaging device 118 may be installed at a fixed location (e.g., an airport), wherein the processing system 108 may download real-time image data from the imaging device 118 and correlate the downloaded image data with the three-dimensional conformal synthetic perspective view of the terrain proximate the aircraft 130 rendered on the display device 102.

Figure 2:
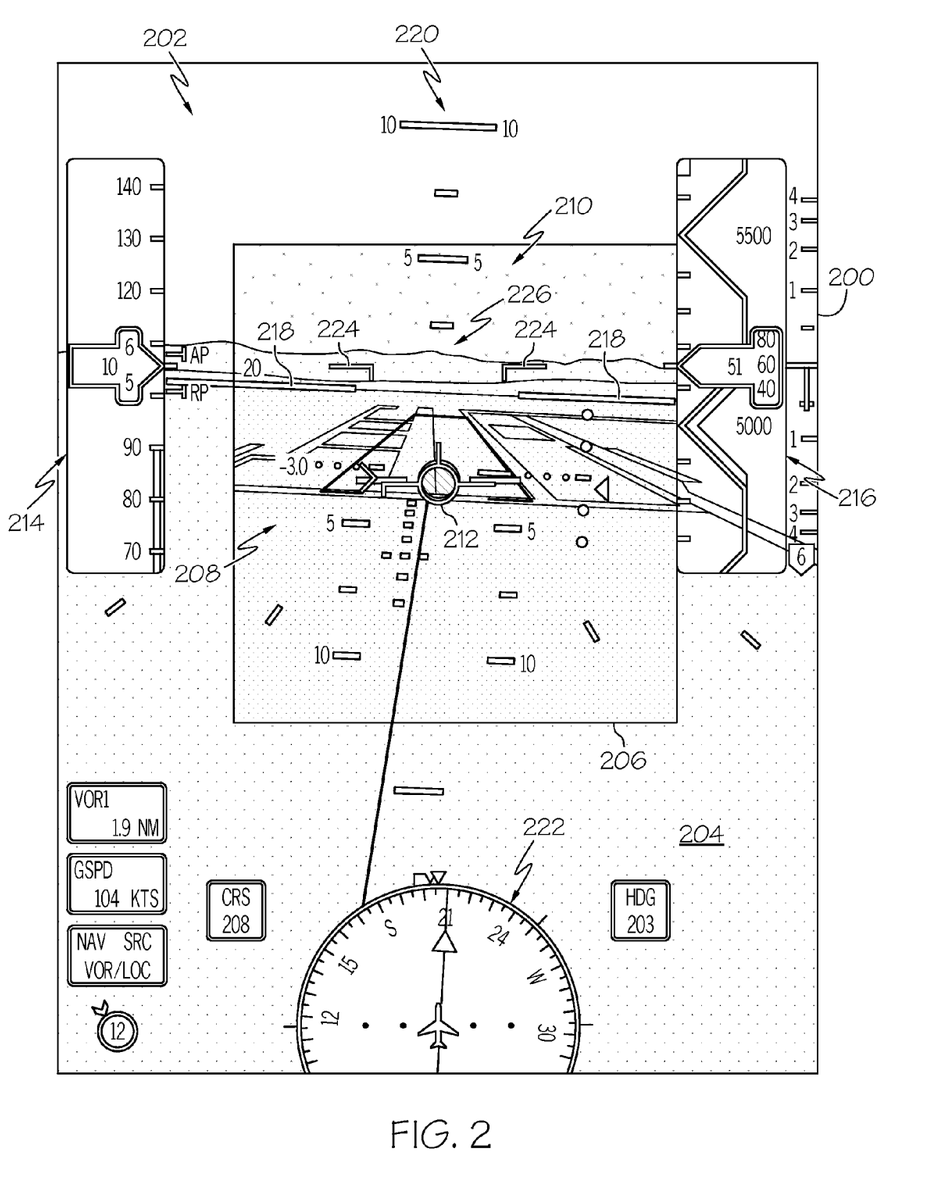
FIG. 2 is an exemplary flight deck display, including an image captured by an imaging device overlying a synthetic perspective view of terrain, suitable for use with the display system of FIG. 1 or the display process of FIG. 3 in accordance with one or more embodiments.

Referring now to FIG. 2, and with continued reference to FIG. 1, in an exemplary embodiment, the processing system 106 and the graphics system 108 are cooperatively configured to control the rendering of a flight deck display 200 on the display device 102. As illustrated in FIG. 2, in an exemplary embodiment, the flight deck display 200 includes a primary flight display 202. It should be appreciated that flight deck display 200 as depicted in FIG. 2 represents the state of a dynamic display frozen at one particular time, and that the flight deck display 200 may be continuously refreshed during operation of the aircraft 130 to reflect changes in the altitude and/or position of the aircraft 130.

In the illustrated embodiment, primary flight display 202 includes several features that are graphically rendered, including, without limitation a synthetic perspective view of terrain 204, a reference symbol 212 corresponding to the current flight path of the aircraft 130, an airspeed indicator 214 (or airspeed tape) that indicates the current airspeed of the aircraft 130, an altitude indicator 216 (or altimeter tape) that indicates the current altitude of the aircraft 130, a zero pitch reference line 218, a pitch ladder scale 220, a compass 222, and an aircraft reference symbol 224, as described in greater detail below. The embodiment shown in FIG. 2 has been simplified for ease of description and clarity of illustration—in practice, embodiments of the primary flight display 202 may also contain additional graphical elements corresponding to or representing pilot guidance elements, waypoint markers, flight plan indicia, flight data, numerical information, trend data, and the like. For the sake of clarity, simplicity, and brevity, the additional graphical elements of the primary flight display 202 will not be described herein.

In an exemplary embodiment, the terrain 204 is based on a set of terrain data that corresponds to a viewing region proximate the current location of aircraft 130 that corresponds to the forward-looking cockpit viewpoint from the aircraft 130. The graphics system 108 includes or otherwise accesses database 120, and in conjunction with navigational information (e.g., latitude, longitude, and altitude) and orientation information (e.g., aircraft pitch, roll, heading, and yaw) from the processing system 106 and/or navigation system 112, the graphics system 108 controls the rendering of the terrain 204 on the display device 102 and updates the set of terrain data being used for rendering as needed as the aircraft 130 travels. As shown, in an exemplary embodiment, the graphics system 108 is configured to render the terrain 204 in a perspective or three dimensional view that corresponds to a flight deck (or cockpit) viewpoint. In other words, terrain 204 is displayed in a graphical manner that simulates the flight deck viewpoint, that is, the vantage point of a person in the cockpit of the aircraft 130. Thus, features of terrain 204 are displayed in a conformal manner, relative to the earth. For example, the relative elevations and altitudes of features in terrain 204 are displayed in a virtual manner that emulates reality. Moreover, as the aircraft navigates (e.g., turns, ascends, descends, rolls, etc.), the graphical representation of terrain 204 and other features of the perspective display can shift to provide a continuously updated virtual representation for the flight crew. It should be appreciated that the perspective view associated with primary flight display 202 need not always include a perspective view of terrain 204. For example, in the absence of terrain data, the perspective view of the display may appear flat, blank, or otherwise void of conformal terrain graphics.

As illustrated in FIG. 2, in an exemplary embodiment, a graphical representation of the image data 206 (alternatively referred to herein as the captured image) obtained from an imaging device (e.g., imaging device 118) is displayed or rendered overlying the synthetic perspective view of terrain 204. In this regard, the primary flight display 202 of FIG. 2 corresponds to an enhanced synthetic perspective view of the viewing region proximate the aircraft 130. The captured image 206 is based on image data obtained by the imaging device 118 for the imaging region proximate the aircraft 130, and the captured image 206 is positioned within the primary flight display 202 overlying the terrain 204 in a manner that accurately reflects and/or corresponds to the approximate real-world location of the image data obtained by imaging device 118 with respect to the real-world terrain depicted by terrain 204. As described above, the imaging device 118 is calibrated such that the captured image 206 is aligned with a particular location within the viewing region of the primary flight display 202 and corresponds to an anticipated line-of-sight for the forward-looking cockpit viewpoint. In other embodiments, the processing system 106 and/or graphics system 108 may identify a feature within the image data (e.g., a runway) and align the identified feature to its corresponding graphical representation in the terrain data used for rendering the terrain 204 to appropriately position the captured image 206 with respect the terrain 204. As described above, in an exemplary embodiment, the captured image 206 corresponds to an image (or a frame of video) obtained by an IR video camera or a MMW video camera. In this regard, the captured image 206 is updated at the refresh rate of the imaging device 118 to provide substantially real-time imagery (or video) for the imaging region on the primary flight display 202.

As described in greater detail below, in an exemplary embodiment, a first portion 208 of the captured image 206 that is below a particular attitude reference (alternatively referred to herein as the lower portion) is visually distinguishable from a second portion 210 of the captured image 206 that is above the attitude reference (alternatively referred to herein as the upper portion). In this regard, the lower portion 208 of the captured image 206 is displayed using one or more visually distinguishable characteristic(s) that are different from those used to display the upper portion 210. The visually distinguishable or distinctive characteristics are preferably chosen to allow a pilot or crew member to quickly and intuitively ascertain the attitude of the aircraft 130 relative to the earth. Depending on the embodiment, the "visually distinguishable characteristics" or "visually distinctive characteristics" may be realized by using one more of the following characteristics, individually or in any combination thereof: different colors, different hues, different tints, different levels of transparency, translucency, opacity, contrast, brightness, or the like, different shading, texturing, and/or other graphical effects.

As illustrated in FIG. 2, the flight path reference symbol 212, the airspeed indicator 214, the altitude indicator 216, the zero pitch reference line 218, the pitch ladder scale 220, the compass 222, and the aircraft reference symbol 224 are displayed or otherwise rendered overlying the terrain 204 and/or captured image 206. During flight, the flight path reference symbol 212 moves within primary flight display 202 such that it generally indicates the direction the aircraft 130 is currently moving. The pitch ladder scale 220 includes a number of parallel marks and/or alphanumeric characters that indicate the pitch of the aircraft 130 relative to a reference orientation for the body of the aircraft 130 using any convenient scale. Notably, a pitch angle of zero degrees with respect to the reference orientation for the body of the aircraft 130 (i.e., zero pitch on pitch ladder scale 220) corresponds to the zero pitch reference line 218. In an exemplary embodiment, the zero pitch reference line 218 is rendered in a conformal manner such that it moves (up and down) and rotates (clockwise and counterclockwise) within the primary flight display 202 in accordance with the current orientation (e.g., pitch, roll, and yaw) of the aircraft 130. In this regard, the rendering and display of zero pitch reference line 218 is influenced by the actual zero pitch orientation of the aircraft. It will be appreciated that the zero pitch reference line 218 generally corresponds to an artificial horizon line (e.g., an angle of zero degrees for the aircraft 130 nose to pitch up or down with respect to the real horizon parallel to the local earth surface), such that portions of the primary flight display 202 (e.g., portions of terrain 204) above the zero pitch reference line 218 correspond to real-world features that are above the current altitude of the aircraft 130 portions of the primary flight display 202 below the zero pitch reference line 218 correspond to real-world features that are below the current altitude of the aircraft 130. Thus, the zero pitch reference line 218 may be utilized to discern relative altitude and/or attitude of the terrain 204 with respect to the aircraft 130. Markings of pitch ladder scale 220 that appear above zero pitch reference line 218 correspond to positive pitch of the aircraft, and markings of pitch ladder scale 220 that appear below zero pitch reference line 218 correspond to negative pitch of the aircraft. The "intersection" of an aircraft reference symbol 224 with pitch ladder scale 220 represents the current pitch of the aircraft 130, as indicated on pitch ladder scale 220.

In the illustrated embodiment of FIG. 2, the attitude reference for partitioning the portions 208, 210 of the captured image 206 corresponds to the zero pitch orientation of the aircraft 130, such that the portions 208, 210 of the captured image 206 are conveniently divided by the zero pitch reference line 218. Thus, the lower portion 208 of the captured image 206 corresponds to the portion of the captured image 206 displayed below the zero pitch reference line 218 and the upper portion 210 of the captured image 206 corresponds to the portion of the captured image 206 above the zero pitch reference line 218, and the lower portion 208 is displayed using a visually distinguishable characteristic that is different form that used to display the upper portion 210. It should be noted that the zero pitch attitude reference is provided herein for purposes of explanation, and the subject matter is not intended to be limited to any particular attitude reference for partitioning the display of the captured image 206. Furthermore, it should be noted that in some embodiments, additional and/or other attitude references may be utilized to further partition the captured image 206 in a desired manner, and additional and/or other pitch reference lines may be used to partition the captured image to facilitate attitude awareness.

In an exemplary embodiment, the lower portion 208 of the captured image 206 is displayed in a color corresponding to the terrain 204 that is adjacent to or otherwise proximate the lower portion 208 and with a relatively high level of opacity (e.g., less than about 5% transparency), and in some cases, the lower portion 208 is completely opaque. In this regard, the lower portion 208 is substantially opaque and closely resembles the terrain 204 along the bottom portion of the primary flight display 202 to provide a relatively seamless transition between the terrain data 204 and the lower portion 208 of the captured image 206. It should be noted that in some embodiments, the coloration of the lower portion 208 may vary throughout the lower portion 208 to correspond to the underlying terrain 204, or to otherwise facilitate attitude awareness and image recognition. In contrast, the upper portion 210 is displayed with relatively high level of transparency (e.g., greater than about 70% transparency). For example, as illustrated in FIG. 2, terrain features 226, such as the hills and/or mountains in the synthetic vision background, that are displayed above the zero pitch reference line 218 are perceptible through the upper portion 210 of the captured image 206. In this manner, the upper portion 210 of the captured image 206 does not obscure potentially significant real-world terrain that is above the current altitude of the aircraft 130. For example, in instrument meteorological conditions (IMC), the upper portion 210 of the captured image 206 may not adequately represent distant terrain features (e.g., mountains or buildings) due to clouds, fog, or other weather conditions that obfuscate perception of the terrain features by the imaging device 118. Thus, displaying the upper portion 210 with a relatively high level of transparency allows the pilot to simultaneously perceive the underlying terrain 204 while the captured image 206 is presented in the primary flight display 202. The upper portion 210 may also be displayed in a color corresponding to the terrain 204 that is adjacent to or otherwise proximate the upper portion 210. For example, the upper portion 210 may be displayed in a color corresponding to the sky (e.g., a bluish color).

Figure 3:
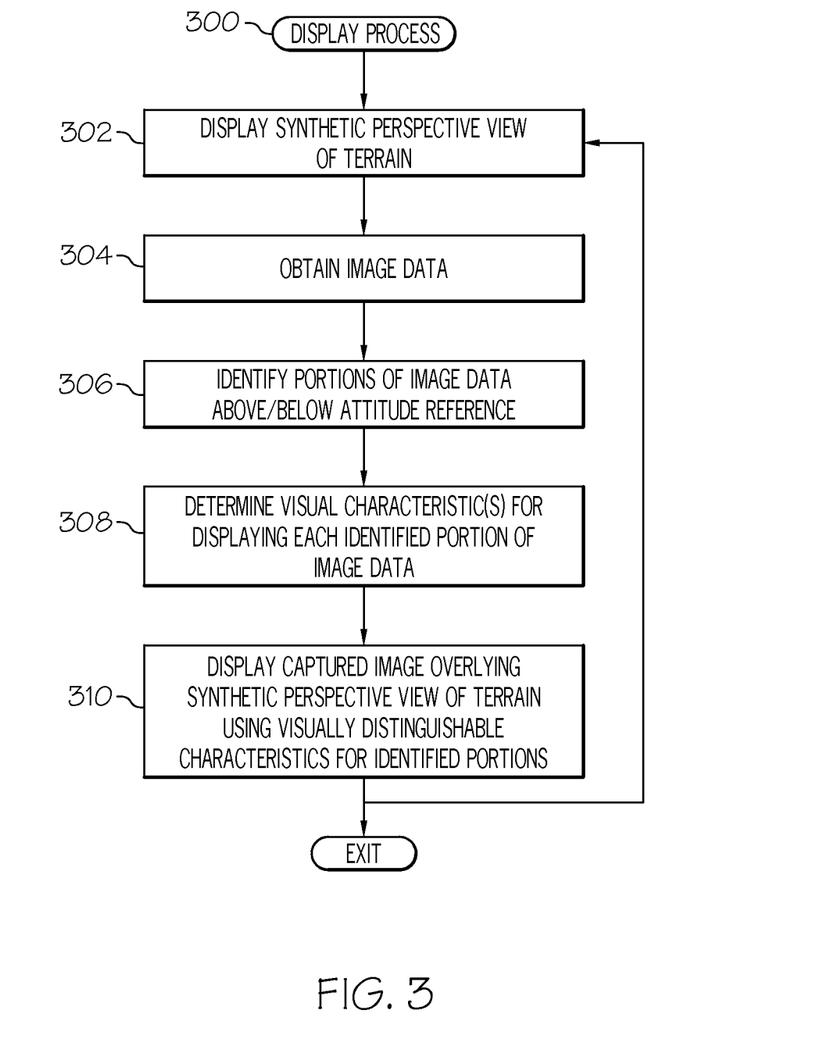
FIG. 3 is a flow diagram of an exemplary display process suitable for use with the display system of FIG. 1 and the flight deck display of FIG. 2 in accordance with one or more embodiments.

Referring now to FIG. 3, in an exemplary embodiment, the display system 100 may be configured to perform a display process 300 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the user input device 104, the processing system 106, the graphics system 108, the communications system 110, the navigation system 112, the FMS 114, the avionics system(s) 116, the imaging device 118 and/or the database 120. It should be appreciated that any number of additional or alternative tasks may be included, and may be incorporated into a more comprehensive procedure or process having additional functionality not described in detail herein.

Referring again to FIG. 3, and with continued reference to FIGS. 1-2, a display process 300 may be performed to display a visually partitioned image data captured by a real-time imaging device on a display device onboard an aircraft. An exemplary embodiment of the display process 300 begins by displaying a three-dimensional synthetic perspective view of terrain for a viewing region proximate the aircraft (task 302). In this regard, in an exemplary embodiment the processing system 106 and/or graphics system 108 are configured to obtain current navigational information and orientation information for the aircraft 130 and display or otherwise render a synthetic perspective view of terrain 204 corresponding to a forward-looking cockpit viewpoint in a primary flight display 202 on the display device 102, as described above in the context of FIG. 2. The display process 300 continues by obtaining image data corresponding to an imaging region proximate the aircraft (task 304). In this regard, one or more imaging devices 118 onboard the aircraft 130 captures, senses, or otherwise obtains real-time imagery for the imaging region and provides the corresponding image data to the processing system 106.

In an exemplary embodiment, the display process 300 continues by determining or otherwise identifying portions of the image data that are above or below a particular attitude reference (task 306). In accordance with one embodiment, the processing system 106 identifies the portions of the image data that are above or below the attitude reference based on the current attitude of the aircraft 130 and the orientation of the imaging device 118 with respect to the aircraft 130. For example, based on the attitude (e.g., pitch, roll, and yaw) of the aircraft 130 and the angle/orientation of the line of sight of the imaging device 118 with respect to the body of the aircraft 130 (e.g., with respect to the longitudinal axis of the aircraft 130), the processing system 106 may determine the relative attitudes for the image data and partition the image data into portions above and below the attitude reference. In another embodiment, when the attitude reference corresponds to the zero pitch orientation of the aircraft 130, the processing system 106 may determine or otherwise identify the portions above and below zero pitch attitude reference based on the relationship between the image data and a zero pitch reference line displayed on the display device 102. For example, in the embodiment illustrated by FIG. 2, the processing system 106 may identify the upper portion 210 as the portion of the captured image 206 that is above the zero pitch reference line 218 and the lower portion 208 as the portion of the captured image 206 below the zero pitch reference line 218. As set forth above, the zero pitch attitude reference is provided herein for purposes of explanation, and the subject matter is not intended to be limited to any particular attitude reference or any particular number of attitude references for partitioning the display of the captured image 206.

Referring again to FIGS. 1-3, in an exemplary embodiment, after identifying the portions of the image data that are above or below the desired attitude reference, the display process 300 continues by determining one or more visually distinguishable characteristics to be used in displaying the respective portions of the image data (task 308). In this regard, for each identified portion of the image data, the display process 300 may determine a particular color, transparency/opacity, contrast, brightness, shading, texture, pattern, and/or other graphical effect to be applied to the respective portion of the image data.

In an exemplary embodiment, the processing system 106 determines the visually distinguishable characteristic(s) to be used in displaying the respective portions of the image data based on the flight phase of the aircraft 130. For example, in accordance with one embodiment, the processing system 106 may determine a transparency level for the portion of the image data that is above the attitude reference (e.g., the upper portion 210) based on the current flight phase of the aircraft 130. In this regard, in response to identifying a flight phase corresponding to the aircraft 130 being on the ground (e.g., a standing phase, a pushback or towing phase, a taxiing phase, or the like), the processing system 106 may determine a relatively low transparency level (e.g., less than 5% transparent) for the upper portion of the image data such that the upper portion of the image data is substantially opaque when the aircraft 130 is on the ground and the background features of the underlying terrain are less significant than when the aircraft 130 is in flight. In response to identifying a flight phase corresponding to the aircraft 130 being in flight, the processing system 106 may determine a relatively higher transparency level (e.g., greater than 70% transparent) for the upper portion of the image data to allow underlying synthetic perspective terrain data to be perceived.

Similarly, in some embodiments, the processing system 106 may determine a color for the portion of the image data that is below the attitude reference (e.g., the lower portion 208) based on the current flight phase of the aircraft 130. For example, the color of the lower portion 208 may be selected to more closely match the runway, taxiway, or building environment the aircraft 130 is currently traversing. In this regard, in response to identifying a flight phase corresponding to the aircraft 130 being on the ground (e.g., a standing phase, a pushback or towing phase, a taxiing phase, or the like), the processing system 106 may identify a color similar to that of asphalt (e.g., black) or concrete (e.g., gray) for the lower portion of the image data such that the lower portion of the image data more closely resembles the underlying asphalt and/or concrete when the aircraft 130 is on the ground. In contrast, in response to identifying a flight phase corresponding to the aircraft 130 being in flight, the processing system 106 may determine the color of the lower portion of the image data based on the color of the terrain data proximate and/or adjacent to the lower portion of the image data. For example, referring again to FIG. 2, the processing system 106 may analyze the color of the terrain 204 bordering the lower portion 208 of the captured image 206 and determine the average color or the predominant color for the displayed terrain 204 bordering the lower portion 208 of the captured image 206. The processing system 106 may then select a color similar to the depicted color of the surrounding terrain 204 for use in displaying the lower portion 208. For example, in response to identifying that the average color of the terrain 204 bordering the lower portion 208 is a tan color, the processing system 106 may determine a similar color, such as a beige color, a darker tan color, or another brown color, to be used in displaying the lower portion 208 of the captured image 206. In this regard, the color for the lower portion 208 of the captured image 206 may differ slightly from the surrounding terrain 204 to allow a pilot or crew member to use the color to distinguish between the captured image 206 and the terrain 204, but the difference between the colors is not likely to distract or otherwise compromise situational awareness.

It should be appreciated that there are numerous possible combinations of visually characteristics that may be used to visually distinguish between portions of the image data, and the subject matter described herein is not intended to be limited to any particular combination. Furthermore, there are numerous criteria that may be used to determine the visually distinguishable characteristic(s) to be used in displaying the respective portions of the image data, and the subject matter is not intended to be limited to any particular criterion. For example, although the subject matter is described above in the context of determining the visual characteristic(s) based on the flight phase of the aircraft 130, other embodiments may determine the visual characteristic(s) based on the time of day (e.g., different colors for daytime and nighttime operation), the current altitude of the aircraft 130, the quality of the image data, user preferences, presence of certain threats, cultural information, surrounding vegetation and/or water features, or the like. In yet other embodiments, the visually distinguishable characteristic(s) to be used in displaying the respective portions of the image data may be predetermined or provided manually (e.g., via user input device 104). For example, a pilot or crew member may manipulate the user input device 104 to specify or otherwise provide input indicative of desired levels of transparency and/or desired colors for the portions of the image data, such as a predetermined color for the lower portion 208 and a predetermined level of transparency for the upper portion 210.

In an exemplary embodiment, after determining the visual characteristic(s) to be used to display each respective portion of the image data, the display process 300 continues by displaying the image data overlying the synthetic perspective view of terrain using the different visually distinguishable characteristics for the identified portions of the image data (task 310). For example, as described above in regards to FIG. 2, the processing system 106 may display the image 206 overlying terrain 204, wherein the portion 210 of the image 206 below the zero pitch reference line 218 is displayed in a color similar to the color of the terrain 204 bordering the lower portion 208 of the image 206 and the lower portion 208 is substantially opaque (e.g., a transparency level less than about 5%), while the portion 208 of the image 206 above the zero pitch reference line 218 is substantially transparent (e.g., a transparency level greater than about 70%) and displayed in a bluish color.

In an exemplary embodiment, the loop defined by tasks 302, 304, 306, 308 and 310 repeats throughout operation of the aircraft 130 to dynamically update the display. In this regard, as the attitude of the aircraft 130 changes, the portions of the captured image may be updated to reflect the instantaneous attitude of the aircraft 130. Additionally, as the color of the underlying terrain changes on the display as the aircraft travels, the color of the lower portion of the captured image may be updated such that it maintains similarity to the surrounding terrain on the display. In an exemplary embodiment, any changes to the visually distinguishable characteristics used to display the portions of the captured image are gradually adjusted to prevent distracting the pilot and/or crew or otherwise detracting from situational awareness. For example, as described above, in an exemplary embodiment, the upper portion of the captured image is substantially transparent when the aircraft 130 is in flight, but is relatively opaque when the aircraft 130 is operating on the ground. Thus, after takeoff, the transparency of the upper portion of the captured image is gradually increased from the initially low level (relatively opaque) to the desired level of transparency.

To briefly summarize, the methods and systems described above allow a user, such as a pilot or crew member, to quickly and intuitively ascertain the relative attitude and/or relative altitude of real-time imagery that is displayed in the primary flight display. For example, rather than being presented as a monochrome image that increases the perceptual processing and mental workload of the pilot and/or crew to achieve sufficient attitude awareness, a captured image is partitioned into separate portions, wherein the portion of the captured image below an attitude reference (e.g., the zero pitch attitude for the aircraft) is displayed in a manner that provides a seamless transition to/from the underlying synthetic terrain while the upper portion of the captured image is displayed in a different color than the lower portion of the captured image and in a manner that allows the underlying synthetic terrain to be perceived. In this manner, a pilot can quickly and intuitively ascertain the relative attitude and/or relative altitude of the aircraft with respect to the features shown in the captured image while maintaining situational awareness.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context, and terms such as "upper" and "lower" refer to the drawings to which reference is made. Such terminology may include the words specifically mentioned above, derivatives thereof, and words of similar import.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for displaying information on a display device associated with a vehicle, the method comprising:
    displaying, on the display device, a synthetic perspective view of terrain corresponding to a flight deck viewpoint;
    obtaining image data for an imaging region proximate the vehicle from a camera oriented to capture real-time imagery corresponding to a forward looking cockpit view of the imaging region;
    identifying a first portion and a second portion of the image data based on a current attitude of the vehicle determined by a navigation system onboard the vehicle, the first portion corresponding to a portion of the image data above an attitude reference and the second portion corresponding to a portion of the image data below the attitude reference;
    displaying, on the display device, a graphical representation of a first portion of the image data overlying the synthetic perspective view of terrain using a first visually distinguishable characteristic; and
    displaying, on the display device, a graphical representation of a second portion of the image data overlying the synthetic perspective view of terrain using a second visually distinguishable characteristic, wherein the first visually distinguishable characteristic and the second visually distinguishable characteristic are different.

2. The method of claim 1, further comprising determining a first color corresponding to the synthetic perspective view of terrain proximate the second portion of the image data, wherein:
displaying the graphical representation of the second portion comprises displaying the graphical representation of the second portion in the first color; and
displaying the graphical representation of the first portion comprises displaying the graphical representation of the first portion in a second color, the first color and the second color being different.

3. The method of claim 1, further comprising rendering a zero pitch reference line corresponding to the zero pitch orientation of the vehicle on the primary flight display, wherein:
the attitude reference corresponds to the zero pitch orientation of the vehicle;
the first portion is displayed above the zero pitch reference line; and
the second portion is displayed below the zero pitch reference line.

4. The method of claim 3, further comprising identifying the first portion and the second portion based on a relationship between the image data and the zero pitch reference line.

5. The method of claim 1, further comprising identifying the first portion and the second portion based on the current attitude of the vehicle and an orientation of the camera with respect to the vehicle.

6. The method of claim 1, wherein:
displaying the graphical representation of the first portion comprises displaying the graphical representation of the first portion with a first transparency; and
displaying the graphical representation of the second portion comprises displaying the graphical representation of the second portion with a second transparency, the first transparency being greater than the second transparency.

7. The method of claim 1, wherein:
the vehicle is an aircraft; and
the method further comprises the steps of:
identifying a current flight phase for the aircraft; and
identifying the first visually distinguishable characteristic or the second visually distinguishable characteristic based on the flight phase of the aircraft.

8. The method of claim 7, wherein:
identifying the first visually distinguishable characteristic or the second visually distinguishable characteristic based on the flight phase of the aircraft comprises:
identifying a transparency for the first portion of the image data based on the current flight phase; and
identifying a color for the second portion of the image data based on the current flight phase; and
displaying the graphical representation of the first portion comprises:
displaying the graphical representation of the first portion with the identified transparency; and
displaying the graphical representation of the second portion in the identified color.

9. A display system comprising:
a display device having a primary flight display rendered thereon, the primary flight display including a synthetic perspective view of terrain corresponding to a flight deck viewpoint;
a camera onboard an aircraft configured to capture imagery corresponding to a forward looking cockpit view of an imaging region, resulting in image data for the imaging region; and
a processing system coupled to the display device and the camera, wherein the processing system is configured to display a graphical representation of the image data overlying the synthetic perspective view of terrain on the primary flight display, wherein:
a first portion of the graphical representation is visually distinguishable from a second portion of the graphical representation;
the first portion and the second portion of the image data are identified based on a current attitude of the aircraft determined by a navigation system onboard the aircraft;
the first portion of the graphical representation overlying the synthetic perspective view of terrain corresponds to a first portion of the image data above an attitude reference; and
the second portion of the graphical representation overlying the synthetic perspective view of terrain corresponds to a second portion of the image data below the attitude reference.

10. The display system of claim 9, the synthetic perspective view of terrain comprising a graphical representation of terrain proximate the aircraft, wherein the second portion of the graphical representation of the image data is displayed having a color corresponding to a color of the graphical representation of terrain proximate the second portion.

11. The display system of claim 10, wherein the first portion of the graphical representation of the image data has a transparency greater than 70%.

12. The display system of claim 9, wherein:
the attitude reference corresponds to a zero pitch orientation of the aircraft;
the primary flight display includes a zero pitch reference line corresponding to the zero pitch orientation of the aircraft;
the first portion of the graphical representation is displayed above the zero pitch reference line; and
the second portion of the graphical representation is displayed below the zero pitch reference line.

13. The display system of claim 9, wherein the processing system is configured to:
obtain a current attitude of the aircraft; and
identify the first portion and the second portion of the image data based on the current attitude of the aircraft and an orientation of the camera with respect to the aircraft.

14. The display system of claim 9, wherein the camera comprises an infrared video camera or a millimeter wave video camera.

15. The display system of claim 9, wherein the camera is mounted in or near a nose of the aircraft.

16. The display system of claim 15, wherein the camera comprises an infrared video camera or a millimeter wave video camera.

17. The display system of claim 9, the synthetic perspective view of terrain corresponding to a viewing region, wherein a center of the imaging region is aligned with a geometric center of the viewing region.

18. The display system of claim 9, wherein:
the graphical representation of the first portion is substantially transparent; and
the graphical representation of the second portion is substantially opaque.

19. A flight deck display for an aircraft, the flight deck display having rendered thereon a primary flight display comprising:
- a synthetic perspective view of terrain corresponding to a flight deck viewpoint for a region proximate the aircraft; and
- a graphical representation of image data overlying the synthetic perspective view of terrain, the image data corresponding to real-time imagery captured by a camera onboard the aircraft and oriented to capture the real-time imagery corresponding to a forward looking cockpit view, wherein:
    - a first portion of the graphical representation of the image data is visually distinguishable from a second portion of the graphical representation of the image data;
    - the first portion and the second portion of the image data are identified based on a current attitude of the aircraft determined by a navigation system onboard the aircraft;
    - the first portion of the graphical representation overlying the synthetic perspective view of terrain corresponds to a first portion of the image data above an attitude reference; and
    - the second portion of the graphical representation overlying the synthetic perspective view of terrain corresponds to a second portion of the image data below the attitude reference.

20. The flight deck display of claim 19, the attitude reference corresponding to a zero pitch orientation of the aircraft, wherein:
- the primary flight display comprises a zero pitch reference line corresponding to the zero pitch orientation of the aircraft;
- the first portion of the graphical representation is displayed above the zero pitch reference line;
- the second portion of the graphical representation is displayed below the zero pitch reference line;
- a transparency of the first portion of the graphical representation is greater than a transparency of the second portion of the graphical representation; and
- a color of the second portion of the graphical representation corresponds to the synthetic perspective view of terrain proximate the second portion of the graphical representation.

* * * * *